United States Patent [19]

Dietlein et al.

[11] Patent Number: 4,686,244

[45] Date of Patent: Aug. 11, 1987

[54] INTUMESCENT FOAMABLE COMPOSITIONS

[75] Inventors: John E. Dietlein, Bay City; Thomas C. Hampton, Midland, both of Mich.

[73] Assignee: Dow Corning Corporation, Midland, Mich.

[21] Appl. No.: 942,746

[22] Filed: Dec. 17, 1986

[51] Int. Cl.$^4$ .......................... C09K 21/14; C08J 9/22
[52] U.S. Cl. ...................................... 523/179; 427/230; 428/920; 521/54; 521/91; 521/92; 521/154; 521/907; 523/218; 523/219
[58] Field of Search ...................... 523/179, 218, 219; 521/907, 54, 91, 92, 154; 428/920; 427/230

[56] References Cited

U.S. PATENT DOCUMENTS

| 3,317,455 | 5/1967 | Blome et al. | 523/219 |
| 3,429,838 | 2/1969 | Hersh | 521/154 |
| 3,553,002 | 1/1971 | Haraway, Jr. et al. | 523/219 |
| 4,000,108 | 12/1976 | Yokokawa et al. | 523/219 |
| 4,031,059 | 6/1977 | Strauss | 523/179 |
| 4,072,635 | 2/1978 | Jeram | 523/219 |

FOREIGN PATENT DOCUMENTS 715140 8/1965 Canada.

Primary Examiner—Morton Foelak
Attorney, Agent, or Firm—Robert Spector

[57] ABSTRACT

The intumescent material of this invention comprises a filled polyorganosiloxane composition that is elastomeric in the cured form and up to 70 parts by weight per 100 parts by weight of said composition of hollow, thermoplastic microspheres filled with a volatile liquid. The materials are particularly useful as flame and smoke barriers in passages of partitions that are traversed by thermoplastic articles such as pipes and conduits, and can optionally contain chemical blowing agents.

14 Claims, No Drawings

INTUMESCENT FOAMABLE COMPOSITIONS

BACKGROUND OF THE INVENTION

1. Field of the Invention

This invention relates to flame and smoke barriers. More particularly, this invention relates to intumescent compositions useful as flame and smoke barriers in passages traversing partitions such as walls and floors. The passages are occupied by thermoplastic articles such as pipes and conduits that undergo a decrease in external dimensions when exposed to flame temperatures.

Recent modifications in building codes permit the use of pipes conduits and other articles formed from thermoplastic materials such as polyvinyl chloride. The advantages of such articles are their lower material and installation costs relative to the same articles fabricated from metals. These economic advantages can be more than offset by the flammability and relatively low melting point of many commonly used thermoplastic materials. In the event of a fire in an area where articles such as pipes and/or conduits formed from thermoplastic or other heat sensitive materials pass through a partition such as a wall or floor, these materials melt and create an opening in the partition through which flames and smoke can spread to the area on the other side of the partition.

It is known to seal passages in partitions that are traversed by pipes. conduits and electrical cables using foamable polyorganosiloxane compositions such as those disclosed in U.S. Pat. No. 3,923,705. which issued to Smith on Dec. 2, 1975. This patent teaches preparing foams by blending an organohydrogensiloxane. a hydroxylated organosiloxane and a platinum catalyst in amounts such that the ratio of silicon-bonded hydrogen atoms to silicon-bonded hydroxyl radicals is from 2.5 to 40. The composition can optionally include a vinyl containing triorganosiloxy terminated polydiorganosiloxane and carbon black as a flame retarding agent.

U.S. Pat. No. 4,433,069, which issued to Harper on Feb. 21, 1984 discloses adding fibrous and particulate materials to the foamable compositions of the aforementioned Smith patent to decrease the rate of burnthrough. A disadvantage of foams prepared using compositions described in the Smith and Harper patents is that when these foams are installed around thermoplastic articles that melt or decompose when exposed to the intense heat generated by a fire, the foams usually cannot expand sufficiently to fill the resultant void, and thereby cease functioning as a fire and smoke barrier.

U.S. Pat. No. 3,983,082. which issued to Pratt et al on Sept. 28, 1976, relates to intumescent silicone resin compositions containing (1) a mixture of iron oxide and potassium phosphate, which decompose at flame temperatures to produce a crust, (2) a char—forming material such as tripentaerythritol and (3) a heat activated blowing agent such as a melamine compound. The compositions are intended for use as coatings on relatively thin substrates such as the supporting members of gas turbine engines to protect the substrates from burning through in the event of a fire. If the compositions were used to fill passages occupied by heat sensitive articles, the crusty, brittle shell that functions as an effective heat insulator would not allow the composition to expand sufficiently to fill the void remaining following shrinkage and/or collapse of the thermoplastic article.

The prior art discloses foamable, elastomeric polyorganosiloxane compositions wherein the agent responsible for formation of the foam is an organic compound that decomposes when heated to produce a gas. If a composition of this type were evaluated as a fire barrier by placing it in a relatively narrow passage traversed by at least one hollow thermoplastic article and subsequently exposing the composition to the intense heat generated by a fire, substantially all of the available gas would be liberated when the temperature within the passage reached the decomposition temperature of the blowing agent. Once this occurred. there would be only a relatively limited capability for additional expansion to compensate for subsequent void formation resulting from the collapse of thermoplastic articles within the passage. Foamable compositions containing only chemical blowing agents would therefore be unsuitable for use as fire and smoke barriers under these conditions.

An additional disadvantage of using a chemical blowing agent in the relatively narrow confines of a passage traversing a partition is rupturing of the cell walls of the foam or complete disintegration of the cellular structure due to the pressure resulting from the gas generated during a rapid decomposition of the blowing agent. The cured product could not function as a fire or smoke barrier.

Canadian patent No. 715,140. which issued on Aug. 3, 1965, teaches a method for producing closed cell sponge rubber by blending gas filled thermoplastic microspheres into an uncured or partially cured rubber formulation, shaping the resultant composition into the desired form using conventional fabricating means and then heating the composition while allowing it to expand in the desired directions to form the final foam product. Silicones, a commercially accepted nomenclature for polyorganosiloxane elastomers, are one of the many classes of rubbers considered suitable for use with the disclosed method. This patent does not disclose expansion of previously cured foams or using either foamable compositions or cured foams containing gas-filled microspheres as fire and smoke barriers.

U.S. Pat. No. 4,433,022 discloses three-dimensional decorative facings for ceiling and wall boards. The facings are formed by applying a paste or plastisol to selected areas of a fabric adhered to a ceiling or wall board and subsequently heating to expand the material. The agents responsible for the expansion pastes and plastisols are hollow, microspheres having a shell formed from a thermoplastic synthetic resin and containing a volatile organic liquid that boils below the glass transition temperature of the resin. When the microspheres are heated the pressure generated by volatilization of the liquid causes expansion of the particle to form a monocellular, generally spherical shell containing the volatilized liquid entrapped therein.

The teaching of this patent is limited to use of the certain expandable pastes and plastisols as coating materials. There is no suggestion of incorporating the disclosed liquid filled microspheres into polyorganosiloxane compositions suitable for preparing self supporting foams or the utility of such foams as fire and smoke barriers.

An objective of this invention is to provide intumescent compositions suitable for use as fire and smoke barriers in conjunction with thermoplastic articles.

Under the intense heat generated by a fire the present compositions expand to fill voids created by shrinkage and/or collapse of adjacent hollow thermoplastic articles while maintaining the structural integrity of the barrier.

SUMMARY OF THE INVENTION

The intumescent compositions of this invention consist essentially of an intumescent polyorganosiloxane composition that is elastomeric in the cured form and contains up to 50 percent by weight of hollow, thermoplastic microspheres filled with a volatile liquid. The heat induced volatilization of this liquid is responsible for at least a portion of the expansion occurring during exposure of the composition to the heat generated by a fire.

DETAILED DESCRIPTION OF THE INVENTION

This invention provides an intumescent material capable of forming and maintaining a barrier to the transmission of flame and smoke, said material comprising
100 parts by weight of a curable, filled polyorganosiloxane composition which is convertible upon curing to a flame retardant elastomer; and
from 1 to 70 parts by weight of hollow microspheres formed from a thermoplastic organic polymer and containing therein a liquid having a boiling point of from 50 to about 200 degrees C. under atmospheric pressure.

The unique feature of the present intumescent materials resides in their retaining an ability to expand during an exposure to intense heat without any substantial loss of structural integrity. When the materials are used to seal passages in partitions that are traversed by hollow thermoplastic articles the materials expand sufficiently to fill the voids resulting from heat induced shrinkage, collapse and/or decomposition of these articles. A barrier is thereby maintained against transmittal of both fire and smoke through the passage into the area on the other side of the partition.

One of the ingredients of the present materials is a filled polyorganosiloxane composition that cures to yield a flame retardant elastomer. The curing reaction can occur at room temperature or at elevated temperatures of up to about 150 degrees C. or higher.

Curable elastomer-forming polyorganosiloxane compositions containing finely divided fillers such as silica are well known and typically include, in addition to the filler, at least one liquid polydiorganosiloxane and a means for curing the polydiorganosiloxane to an elastomer. These compositions often contain a filler treating agent to prevent a phenomenon referred to as "creping" and additives to impart various desirable properties to the cured elastomer, such as strength, toughness, color, adhesion, flame retardancy, and heat stability.

The consistency of curable polyorganosiloxane compositions of this invention can vary from a viscous liquid to a paste or putty to a gum, depending upon the viscosity of the polydiorganosiloxane ingredient(s) and the type and amount of filler(s). To facilitate installation of the present materials within a cavity or passage in a partition such as the wall or floor of a building it is preferable that the material have the consistency of a thick paste or a putty in the absence of shearing forces. Liquid materials can be used if suitable retaining means are provided to keep the material in the desired location until it cures.

The polydiorganosiloxane ingredient of the present curable compositions is characterized by repeating units of the general formula RR'SiO, where R and R' represent identical or different monovalent hydrocarbon or substituted hydrocarbon radicals. The substituents on the hydrocarbon radicals are preferably halogen atoms. The term "hydrocarbon" is intended to include alkyl, alkenyl, cycloalkyl, aryl, alkaryl and aralkyl radicals containing from 1 up to 20 or more carbon atoms. Based on availability of the chlorosilanes typically used as starting materials to prepare polydiorganosiloxanes. the radicals represented by R and R' are lower alkyl containing from 1 to 4 carbon atoms, alkenyl containing 2 or 3 carbon atoms, fluoroalkyl containing from 1 to 4 carbon atoms or phenyl. Most preferably the alkyl radical is methyl, the fluoroalkyl radical is 3.3.3- trifluoropropyl and the alkenyl radical is vinyl.

Depending upon the physical properties desired for the curable compositions of this invention and the final cured elastomer, the consistency of the polydiorganosiloxane can range from a pourable liquid to a gum. Typically the viscosity of this material is from about 0.1 Pa.s up to about 1000 Pa.s.

In addition to diorganosiloxane units the polydiorganosiloxane can contain small concentration of other siloxane units, including monoorganosiloxane units of the general formula $RSiO_{3/2}$ and $SiO_{4/2}$ units. These units can either be the result of impurities present in the intermediates used to prepare the polydiorganosiloxane or the intermediates responsible for these units can be intentionally added for the purpose of modifying the properties of the cured elastomer.

The terminal units present on the polydiorganosiloxane molecules will depend upon the reaction used to cure the composition. One type of composition, referred to hereinafter as I, are room temperature vulcanizable (RTV) compositions and cure in the presence of atmospheric moisture. These compositions typically contain at least one polydiorganosiloxane having hydroxyl groups bonded to the terminal silicon atoms and include as the crosslinking agent a silane having at least three hydrolyzable groups bonded to each silicon atom. The hydrolyzable groups are typically carboxy, alkoxy, amido or ketoximo. The composition may also contain a catalyst to accelerate the hydrolysis and/or curing reactions.

A second type of curable polyorganosiloxane composition, referred to hereinafter as II, contains at least one of the aforementioned polydiorganosiloxane wherein the reactive groups are hydroxyl or an ethylenically unsaturated hydrocarbon radical such as vinyl or allyl. These reactive groups are typically located at the terminal positions of the polydiorganosiloxane molecule.

The compositions cure by reaction of the polydiorganosiloxane with an organohydrogensiloxane crosslinking agent containing at average of at least three silicon bonded hydrogen atoms per molecule. This reaction is typically catalyzed by platinum or a platinum compound. Hexachloroplatinic acid and complexes of this compound with certain organosilicon compounds constitute a preferred class of catalysts because of their reactivity and compatibility with the other ingredients of the polyorganosiloxane composition.

Organohydrogensiloxanes containing an average of at least three silicon bonded hydrogen atoms per molecule are known compounds. These compounds contain from as few as three silicon atoms per molecule up to an average of 20 or more. and exhibit a viscosity of up to 10 Pa.s or higher at 25 degrees C. These crosslinking agents contain repeating units of the formulae $HSiO_{1.5}$, $R'HSiO$ and/or $R'_2HSiO_{0.5}$. The molecules of this ingredient may also include one or more monoorganosiloxane, diorganosiloxane, triorganosiloxy and $SiO_2$ units that do not contain silicon bonded hydrogen atoms.

In the formulae for the organohydrogensiloxanes, R' is a monovalent hydrocarbon radical or substituted monovalent hydrocarbon radical as defined hereinabove for the R radical of the polydiorganosiloxane. Alternatively, the crosslinking agent can be a cyclic compound containing diorganosiloxane and organohydrogen-siloxane units or a compound of the formula $Si(OSiR'_2H)_4$.

In one preferred type of organohydrogensiloxane R' is methyl and the organohydrogensiloxane is a linear trimethylsiloxy terminated polymethylhydrogensiloxane or a dimethylsiloxane/methylhydrogensiloxane copolymer containing an average of from 10 to about 50 repeating units per molecule of which from 3 to 5 are methylhydrogensiloxane.

The molecular weights of the vinyl- or hydroxyl containing polydiorganosiloxane and the organohydrogensiloxane together with the number and distribution of the silicon-bonded hydrogen atoms, hydroxyl groups and/or ethylenically unsaturated hydrocarbon radicals within these ingredients will determine the location of crosslinks in the cured composition. The concentration of crosslinks per unit area is often referred to as the "crosslink density" and determines certain physical properties of the cured elastomer, particularly hardness, compressibility and resiliency.

The particular combinations of polydiorganosiloxane(s) and organohydrogensiloxane(s) yielding the desired combination of physical properties can readily be determined by routine experimentation with a knowledge of this invention.

The molar ratio of silicon bonded hydrogen atoms to the vinyl or other ethylenically unsaturated hydrocarbon radicals present in the polydiorganosiloxane is one of factors in determining the properties of the cured elastomer. Because of the difficulty often experienced in achieving a complete reaction between all of the silicon bonded hydrogen atoms and all of the vinyl or other ethylenically unsaturated hydrocarbon radicals present in the reaction mixture, it is desirable to have an stoichiometric excess of one of these species in a curable composition. In the present compositions this ratio is from 0.05 to 20 silicon bonded hydrogen atoms per vinyl or other ethylenically unsaturated hydrocarbon radical.

The preferred ratio for a given composition will be determined at least in part by the average molecular weight of the polydiorganosiloxane and the type of organohydrogensiloxane crosslinking agent.

A preferred class of intumescent materials remain in an uncured state until exposed to temperatures of at least about 200 degrees C. Temperatures of this magnitude are typically generated only if a fire were to occur in an area adjacent to the location where the present materials are installed.

One type of curable polyorganosiloxane composition suitable for use in the present materials comprises a polydiorganosiloxane with two silicon bonded hydroxyl groups or vinyl radicals, an organohydrogensiloxane containing at least three silicon bonded hydrogen atoms as the crosslinking agent, a platinum catalyst and a catalyst inhibitor such as an acetylenic compound to prevent curing of the composition at room temperature.

Another type of heat curable polyorganosiloxane compositions, referred to hereinafter as III, contains an organic peroxide as the curing agent for a triorganosiloxy terminated polydiorganosiloxane. The polydiorganosiloxane can be substantially free of ethylenic unsaturation or it may contain up to 5 weight percent of ethylenically unsaturated hydrocarbon radicals such as vinyl. Organic peroxides decompose when heated to generate free radicals which, in turn, initiate polymerization of the polydiorganosiloxane.

The temperature at which the peroxide decomposes is a function of its chemical composition. The peroxide selected for a particular composition will be determined at least in part by the temperature at which it is desired to cure the composition. It is known to control the location within the polydiorganosiloxane molecules at which curing occurs by including vinyl or other ethylenically unsaturated hydrocarbon radicals in these molecules and using a peroxide that reacts preferentially with these radicals.

In addition to a curable polydiororganosiloxane and a crosslinking agent the compositions referred to hereinbefore as I, II and III, also include from about 20 up to about 90 percent by weight of finely divided reinforcing and/or non-reinforcing fillers. Typical reinforcing fillers include fume and precipitated forms of silica. Fillers that provide less reinforcement than silica can also be present in the present compositions, and include quartz, diatomaceous earth, calcium carbonate, pearlite, and vermiculite. Fillers such as aluminum oxide, hydrated aluminum oxide, hydrated cerric oxide and titanium oxide, all of which impart flame retardancy to polyorganosiloxane elastomers, are preferred.

Most preferably the compositions contain at least one filler capable of expanding upon exposure to intense heat. Fillers of this type include the alkali metal silicates such as sodium silicate.

To function most effectively as a flame barrier the present composition should contain at least one additive that imparts additional flame retardancy over and above that inherent in the organosilicon compounds. In addition to the aforementioned flame retarding fillers, other effective flame retardants for polyorganosiloxane compositions include platinum and platinum compounds, used either alone or in combination with organic or inorganic materials such as carbon black and hydrated cerric oxide.

Patents disclosing flame retardant polyorganosiloxane compositions include U.S. Pat. Nos. 4,320,044; 4,310,444; 4,110,300; 3,734,881; 3,839,266; and 3,734,877, all of which are incorporated herein by reference. British patent No. 2,066,279 discloses self-extinguishing, heat stable silicone rubber compositions containing a polydiorganosiloxane, a hydrated form of aluminum oxide and a gamma-type iron sesquioxide or ferroferric oxide.

Antimony compounds will impart flame retardancy to polyorganosiloxane elastomers, however the potentially toxic by-products evolved during combustion of these compounds may preclude them from certain applications.

Because the intumescent materials of this invention are typically used to fill passages traversed by hollow thermoplastic articles that undergo a considerable reduction in external dimensions when subjected to the intense heat generated by a fire, the expansion resulting from heating of the thermoplastic, liquid filled microspheres may be insufficient to fill the resultant void and permit the material to continue functioning as an effective fire and smoke barrier. It is therefore preferred to include from 10 to about 50 percent, based on the total weight of the intumescent material, of a heat activated chemical blowing agent together with the microspheres.

When heated to their decomposition temperature chemical blowing agents liberate a gas that acts in conjunction with the liquid-filled thermoplastic microspheres to expand the present materials. When the chemical blowing agent has been exhausted, the microspheres provide the additional expansion typically required for the material to continue functioning as a flame and smoke barrier following the collapse and/or decomposition of thermoplastic articles present in the passage or cavity that has been sealed using one of the present compositions.

The particular blowing agent used is not critical, and can be any of the organic or inorganic compounds typically used for this purpose. Organic blowing agents include azo compounds, hydrazides, sulfonyl hydrazides, sulfonyl semicarbazides and trazines. Inorganic compounds such as the alkali metal carbonates and bicarbonates, that liberate carbon dioxide when heated, are preferred because of their lower cost relative to organic blowing agents and the absence of potentially toxic by-products when these inorganic compounds decompose.

Foamable polyorganosiloxane compositions wherein the blowing agent is generated as a by-product of the curing reaction can be used to prepare intumescent materials of this invention. Polyorganosiloxane compositions of this type are described in numerous patents. including U.S. Pat. No. 3,923,705 discussed hereinabove. In this instance the blowing agent is hydrogen generated by the reaction of silanol groups present on a polydiorganosiloxane with silicon bonded hydrogen atoms.

The thermoplastic, liquid filled microspheres used in the present intumescent materials are hollow monocellular particles wherein the shell is formed from a thermoplastic organic polymer such as vinylidene chloride. styrene and copolymers of vinylidene chloride and acrylonitrile. The center of the microsphere contains a volatile liquid that will not react with or dissolve the shell material. The liquid is typically organic such as a liquid hydrocarbon or halogenated hydrocarbon boiling from 50 to about 200 C. Some types of liquid-filled microspheres are commercially available.

It should be understood that the shell of the microsphere should not react with or be dissolved by any ingredients present in the curable polyorganosiloxane composition. For example, an acid-sensitive shell material should not be used in combination with an RTV polyorganosiloxane composition containing a triacetoxysilane as the crosslinking agent. The intumescent compositions of this invention are prepared by blending a type I, II or III curable polyorganosiloxane composition described hereinbefore with from about 1 to about 50 percent by weight of thermoplastic. liquid filled microspheres. The quantity of microspheres added will be determined by a number of factors. one of which is the extent to which the polyorganosiloxane composition is expected to expand when functioning as a fire barrier. An additional consideration is whether chemical blowing agents are included in the composition.

Any equipment typically used for blending polyorganosiloxane compositions can be used to process the present materials so long as it will not disintegrate or otherwise damage the microspheres. Liquid compositions can be prepared using conventional mixers. Semisolid compositions such as putties and pastes can be prepared using two- or three roll rubber mills or dough type mixers.

In a preferred end use application, the present compositions are installed in a passage that penetrates a partition such as a wall or floor. The composition can be one that cures at room temperature. however to achieve maximum expansion in the event of a fire. the composition should remain in the uncured form until exposed to a fire. Typically the passage containing compositions of this invention is traversed by one or more hollow thermoplastic articles such as pipes and conduits and the composition is used to seal the free space between the article or articles and the wall of the passage.

Depending upon the particular application, the present material is installed as a fire stop seal throughout the entire length of the passage or penetration in a partition such as a wall or ceiling, or is used to seal only a portion of this length. In a typical application the material of this invention is used to seal only a portion of a passage containing at least one pipe, conduit or other hollow article formed from a thermoplastic material. Both ends of the passage are then filled with a flame retardant material such as a cured polyorganosiloxane elastomer or an inorganic fiber such as mineral wool.

To prevent material from being forced out of the passage by the expanding polyorganosiloxane composition the ends of the passage can be covered with a metal plate or similar retaining device. In the event of a fire the retaining device confines the expanding material within the passage. The resultant pressure exerted by the expanding material serves to collapse and seal off the hollow thermoplastic articles traversing the passage, thereby preventing transmission of flames and smoke through these articles.

The method used to deposit the present material in a passage or other desired location will depend upon the consistency of the composition. Liquid materials can be placed in position by pouring or pumping. Semi-solid materials such as putties and pastes can be applied by trowling or injection into the cavity of passage under pressure.

In those instances where only a relative small amount of expansion, i.e. up to 5 times the initial volume of the composition, is required in the event of a fire, an alternative method for installing the present materials is to first cure the polyorganosiloxane composition in the form of a sheet and then wrap a sufficient number of layers the sheet around the thermoplastic article such that the outer perimeter of the wrapping fits snugly against the wall of the passage. A room temperature curable organosiloxane elastomer composition can be used to seal the ends of the passage. The expansion resulting from swelling of the liquid-filled microspheres at flame temperatures will suffice to form an effective fire and smoke barrier.

The following examples disclose preferred embodiments of the present intumescent materials compositions. The examples should not be interpreted as limiting the scope of the invention as defined in the accompanying claims. All parts and percentages in the examples are by weight unless otherwise indicated.

EXAMPLE 1

This example discloses the extent to which uncured and cured intumescent materials of this invention can expand in the absence of a chemical blowing agent.

A polyorganosiloxane composition of this invention that cures by a platinum catalyzed hydrosilation reaction was prepared by blending the following ingredients to homogeniety.

100 parts of a dimethylvinylsiloxy terminated polydimethylsiloxane having a viscosity of about 0.4 Pa.s at 25° C;

100 parts of finely ground quartz having an average particle size of about 5 microns;

8 parts of lampblack;

0.2 part of a chloroplatinic acid complex of divinyltetramethyldisiloxane diluted with dimethylvinylsiloxy terminated polydimethylsiloxane to provide 0.7 weight percent platinum;

7 parts of a trimethylsiloxy terminated polydiorganosiloxane having an average of five methylhydrogensiloxane units and three dimethylsiloxane units per molecule with a silicon-bonded hydrogen atom content within the range of about 0.7 to 0.8 weight percent;

0.1 part of cyclic methylvinylsiloxanes; and 92 parts of microspheres consisting essentially of a shell of a vinylidene chloride/acrylonitrile copolymer surrounding a cavity containing an encapsulated low boiling liquid hydrocarbon, the weight of microspheres constituting 30 percent of the total weight of the intumescent composition.

Four test samples (A, B, C, and D) were prepared from the resultant intumescent material. Samples A, B, and C measured 1 by 2 by 1 cm. Sample D was in the form of a slab measuring 10 by 13 by 1.3 cm.

Sample A was cured by heating it in an oven for one hour at a temperature of 150 degrees C. During this time the rubber expanded to about 10 times the volume of the initial sample.

Sample B was cured by allowing it to remain for 3 days at room temperature, after which the sample was heated for one hour in an oven maintained at a temperature of 150 degrees C. The final product had expanded to about 5 times the volume of the initial sample.

Sample C was allowed to cure for three days at room temperature, at which time it was contacted with the flame from a burner fueled by Mapp ® gas. The sample expanded to about twice its initial volume during heating.

Sample D was placed on a cardboard sheet measuring 10 by 13 cm. and was allowed to cure for 3 days at room temperature. at which time the entire coated surface of the slab was contacted by the flame of a burner fueled by Mapp ® gas. The elastomer expanded beyond the boundaries of the cardboard sheet and retained its initial flame retardant properties. The cardboard did not burn during the test.

EXAMPLE 2

This example describes an intumescent material of this invention that is in the form of a putty and demonstrates the ability of the material to function as a fire barrier in a passage containing relatively large diameter pipes formed from thermoplastic materials. The test used to evaluate the material as a fire stop was is designated E 814, published by the American Society for Testing of Materials (ASTM).

An intumescent composition was prepared by blending the following ingredients in a dough type mixer to obtain a homogeneous composition.

30 parts of a liquid hydroxyl terminated polydimethylsiloxane having a viscosity of about 50 Pa.s at 25° C.

3 parts of 2.4-dichlorobenzoyl peroxide;

4 parts of the same microspheres used in the preceding Example 1, equivalent to a concentration of 2.6 percent, based on the weight of the intumescent composition;

40 parts of sodium bicarbonate;

20 parts of tabular alumina;

60 parts of finely divided quartz having an average particle size of about 5 microns; and 2 parts of fume silica.

The resultant putty was used to form 2-1.9 cm. -thick seals between the outer wall of a 6.4 cm. -diameter thermoplastic pipe and a 10 cm. diameter circular penetration in a vertically oriented. 12.7 cm. -thick cement wall having a fire rating of two hours. The outward-facing surface of one of the seals was located 0.6 cm. from one of the surfaces of the wall. The second seal was located in the same position relative to the other surface of the wall. In each instance the volume between the outward facing surface of the seal to the surface of the wall was filled with a cured flame retarding sealant available as Firestop Sealant from the Dow Corning Corporation. The pipe was formed from an acrylonitrile/butadiene/styrene terpolymer, and was capped on both ends using a cap formed of the same terpolymer.

The construction of the wall, the arrangement of the pipes that penetrated it, and the method used to conduct the furnace exposure test were in accordance with ASTM test procedure E 814.

After the pipe had been installed and the sealant allowed to cure, one side of the wall was exposed to the flames of a gas-fired furnace wherein the flame temperature was about 1010 degrees C. The pipe extended from the wall for a distance of 30 cm. on the side exposed to the furnace and 90 cm. on the opposite side.

During exposure to the furnace for two hours, the temperature of the pipe on the side of the wall facing away from the furnace did not exceed 199 degrees C. Typically the temperature rose to a maximum of about 149 degrees C. and then decreased to about 38 degrees C. after the portion of the pipe exposed to the furnace collapsed.

Following a two hour exposure in the furnace, the portion of the pipe that had been exposed to the furnace was subjected to the hose stream test described in ASTM test procedure E 814 using a water pressure of 210 kPa and an exposure time of 30 seconds.

The penetration seal withstood the furnace exposure portion of the test without allowing either flame or smoke to be transmitted through the penetration to the unexposed surface of the wall, and the integrity of the seal was not disrupted during the hose stream test and the temperature of the pipe projecting from the wall surface facing away from the furnace did not exceed 163 degrees C. above the ambient temperature in the area adjacent to the surface of the wall facing away from the furnace. All of the penetration seals therefore qualified for a "T" rating.

The foregoing ASTM test procedure was repeated using a wall formed from two 1.6 cm. -thick sheets of gypsum wall board separated by a space of 6.4 cm. The only differences were that in this instance the 6.4 cm. -diameter pipe was fabricated from polybutadiene, the thickness of the seal formed from the putty of the present invention was 2.5 cm. and the thickness of the cured Firestop Sealant layer was 0.6 cm.

After a two hour exposure to the furnace and a being subjected to a hose stream test under the conditions described in the preceding paragraph, the penetration seal qualified for a "T" rating.

That which is claimed is:

1. A method for forming a flame and smoke barrier in a passage through a partition where said passage is traversed by at least one thermoplastic article, said method comprising sealing at least a portion of the length of said passage with an intumescent material comprising 100 parts by weight of a curable, filled polyorganosiloxane composition containing a latent curing agent that is convertible upon curing to a flame retardant elastomer; and from 1 to 70 parts by weight of expandable hollow microspheres formed from a thermoplastic organic polymer and containing therein a liquid having a boiling point of from 50° to about 200° C. under atmospheric pressure.

2. A method according to claim 1, where the polyorganosiloxane composition comprises a polydiorganosiloxane wherein the repeating units are of the formula RR'SiO. where R and R' represent identical or different monovalent hydrocarbon or halogenated hydrocarbon radicals, a curing agent for said polydiorganosiloxane and at least one filler, and the boiling point of said organic liquid is from 50° to 200 degrees C. under atmospheric pressure.

3. A method according to claim 2 where R and R' are individually selected from the group consisting of alkyl radicals containing from 1 to 4 carbon atoms, alkenyl containing 2 or 3 carbon atoms, fluoroalkyl containing from 1 to 4 carbon atoms and phenyl, the filler comprises at least one member selected from the group consisting of silica, quartz and alkali metal silicates, and said polyorganosiloxane composition includes at least one flame retarding agent.

4. A method according to claim 3 where R is methyl and R' is either methyl or 3,3,3-trifluoropropyl and the flame retarding agent comprises platinum, a platinum compound, a metal oxide or a hydrated metal oxide.

5. A method according to claim 4 where said flame retarding agent comprises the combination of platinum or a platinum compound with at least one member selected from the group consisting of carbon black, hydrated alumina and hydrated cerri oxide.

6. A method according to claim 3 where said polydiorganosiloxane contains two vinyl radicals per molecule, said curing agent is a polyorganohydrogensiloxane containing an average of at least three silicon bonded hydrogen atoms per molecule and the polyorganosiloxane composition includes a catalytically effective amount of a hydrosilation catalyst.

7. A method according to claim 6 where said hydrosilation catalyst is a platinum compound.

8. A method according to claim 3 where said curing agent is an organic peroxide.

9. A method according to claim 3 where the concentration of said microspheres constitutes from 10 to 50 parts by weight per 100 parts by weight of said material and said composition contains a chemical blowing agent.

10. A method according to claim 9 where said blowing agent is an alkali metal carbonate or bicarbonate.

11. A method according to claim 10 where blowing agent is sodium bicarbonate and said intumescent material is in the form of a putty or paste that remains in an uncured form until exposed to a temperature of at least 150 degrees C.

12. A method according to claim 3 where said article is formed from a thermoplastic organic polymer.

13. A method according to claim 12 where said thermoplastic polymer is selected from the group consisting of polyvinyl chloride, polybutadiene and acrylonitrile/butadiene/styrene terpolymers.

14. A method according to claim 13 where said article is a pipe or conduit.

* * * * *